United States Patent
Vacek et al.

(10) Patent No.: US 7,739,326 B1
(45) Date of Patent: *Jun. 15, 2010

(54) SYSTEM, METHOD, AND COMPUTER READABLE MEDIA FOR CONFIRMATION AND VERIFICATION OF SHIPPING ADDRESS DATA ASSOCIATED WITH TRANSACTION

(75) Inventors: Jill M Vacek, Blair, NE (US); Mark J Pettay, Omaha, NE (US); Hendryanto Rilantono, Omaha, NE (US); Mahmood S Akhwand, Omaha, NE (US)

(73) Assignee: West Corporation, Omaha, NE (US)

( * ) Notice: Subject to any disclaimer, the term of this patent is extended or adjusted under 35 U.S.C. 154(b) by 205 days.

This patent is subject to a terminal disclaimer.

(21) Appl. No.: 12/128,816

(22) Filed: May 29, 2008

Related U.S. Application Data (63) Continuation of application No. 10/173,794, filed on Jun. 18, 2002, now Pat. No. 7,403,967.

(51) Int. Cl.
*G06F 15/16* (2006.01)
*H04M 1/64* (2006.01)

(52) U.S. Cl. .................. 709/202; 709/203; 379/88.02

(58) Field of Classification Search ............ 709/202, 709/203, 246; 379/88.02
See application file for complete search history.

(56) References Cited

U.S. PATENT DOCUMENTS

| | | | |
|---|---|---|---|
| 3,752,904 A * | 8/1973 | Waterbury | 725/25 |
| 4,752,676 A * | 6/1988 | Leonard et al. | 235/379 |
| 4,792,968 A | 12/1988 | Katz | |
| 4,845,739 A | 7/1989 | Katz | |
| 4,860,360 A * | 8/1989 | Boggs | 704/233 |
| 4,930,150 A | 5/1990 | Katz | |
| 4,932,046 A | 6/1990 | Katz | |
| 4,939,773 A | 7/1990 | Katz | |
| 4,975,945 A | 12/1990 | Carbullido | |
| 4,987,590 A | 1/1991 | Katz | |
| 4,993,068 A * | 2/1991 | Piosenka et al. | 713/186 |
| 5,014,298 A | 5/1991 | Katz | |
| 5,016,270 A | 5/1991 | Katz | |
| 5,018,191 A | 5/1991 | Catron | |

(Continued)

OTHER PUBLICATIONS

Witness Systems, Witness Systems Helps Improve Customer Servcie For Contact Centers Deploying Thin Client Architectures, Press Release, Mar. 6, 2001.

(Continued)

*Primary Examiner*—Ario Etienne
*Assistant Examiner*—Sargon N Nano (57) ABSTRACT

A system, method, and computer readable medium for confirmation and verification of shipping address data associated with a transaction. The invention provides a method of verifying first and at least second shipping address information associated with transactions conducted over a telecommunications network. The first and second shipping address information can be stored respectively in a first format and a second format, such as respective speech and text formats. The method functions by accessing address information pertaining to a specific transaction by extracting the respective address information as stored in both formats. The address information is then compared to each other to ensure that they are consistent. If the address information as stored in the two respective formats are sufficiently inconsistent, the underlying transaction may be dispositioned in various ways according to the difference.

20 Claims, 6 Drawing Sheets

U.S. PATENT DOCUMENTS

| | | | |
|---|---|---|---|
| 5,048,075 A | 9/1991 | Katz | |
| 5,073,929 A | 12/1991 | Katz | |
| 5,091,933 A | 2/1992 | Katz | |
| 5,109,404 A | 4/1992 | Katz | |
| 5,128,984 A | 7/1992 | Katz | |
| 5,153,918 A * | 10/1992 | Tuai | 713/182 |
| 5,179,585 A | 1/1993 | MacMillan, Jr. | |
| 5,185,787 A | 2/1993 | Katz | |
| 5,218,631 A | 6/1993 | Katz | |
| 5,224,153 A | 6/1993 | Katz | |
| 5,239,462 A | 8/1993 | Jones | |
| 5,251,252 A | 10/1993 | Katz | |
| 5,255,309 A | 10/1993 | Katz | |
| 5,259,023 A | 11/1993 | Katz | |
| 5,297,197 A | 3/1994 | Katz | |
| 5,299,260 A | 3/1994 | Shaio | |
| 5,311,572 A | 5/1994 | Friedes | |
| 5,349,633 A | 9/1994 | Katz | |
| 5,351,285 A | 9/1994 | Katz | |
| 5,355,406 A | 10/1994 | Chencinski | |
| 5,359,645 A | 10/1994 | Katz | |
| 5,365,575 A | 11/1994 | Katz | |
| 5,375,161 A | 12/1994 | Fuller | |
| 5,412,727 A * | 5/1995 | Drexler et al. | 713/186 |
| 5,414,755 A * | 5/1995 | Bahler et al. | 379/88.02 |
| 5,442,688 A | 8/1995 | Katz | |
| 5,444,774 A | 8/1995 | Friedes | |
| 5,446,774 A | 8/1995 | Russell | |
| 5,504,805 A * | 4/1996 | Lee | 379/88.03 |
| 5,513,250 A * | 4/1996 | McAllister | 379/91.02 |
| 5,517,558 A * | 5/1996 | Schalk | 379/88.02 |
| 5,535,261 A * | 7/1996 | Brown et al. | 379/88.11 |
| 5,574,776 A | 11/1996 | Leuca | |
| 5,581,630 A * | 12/1996 | Bonneau, Jr. | 382/116 |
| 5,594,784 A | 1/1997 | Velius | |
| 5,608,784 A * | 3/1997 | Miller | 379/88.02 |
| 5,623,539 A | 4/1997 | Bassenyemukasa | |
| 5,625,680 A | 4/1997 | Foladare | |
| 5,625,748 A | 4/1997 | McDonough et al. | |
| 5,634,086 A | 5/1997 | Rtischev | |
| 5,638,430 A | 6/1997 | Hogan et al. | |
| 5,664,050 A | 9/1997 | Lyberg | |
| 5,666,157 A | 9/1997 | Aviv | |
| 5,675,637 A | 10/1997 | Szlam | |
| 5,819,029 A | 10/1998 | Edwards | |
| 5,838,768 A | 11/1998 | Sumar | |
| 5,842,163 A | 11/1998 | Weintraub | |
| 5,862,325 A | 1/1999 | Reed et al. | |
| 5,867,562 A | 2/1999 | Scherer | |
| 5,870,464 A | 2/1999 | Brewster | |
| 5,872,834 A | 2/1999 | Teitelbaum | |
| 5,884,262 A | 3/1999 | Wise et al. | |
| 5,895,447 A | 4/1999 | Ittycheriah et al. | |
| 5,903,225 A | 5/1999 | Schmitt et al. | |
| 5,915,001 A | 6/1999 | Uppaluru | |
| 5,920,838 A | 7/1999 | Mostow et al. | |
| 5,940,476 A | 8/1999 | Morganstein | |
| 5,987,118 A | 11/1999 | Dickerman | |
| 5,987,155 A | 11/1999 | Dunn et al. | |
| 6,011,858 A | 1/2000 | Stock et al. | |
| RE36,580 E | 2/2000 | Bogosian, Jr. | |
| 6,038,334 A | 3/2000 | Hamid | |
| 6,049,602 A | 4/2000 | Foladare et al. | |
| 6,058,303 A | 5/2000 | Astrom | |
| 6,058,363 A | 5/2000 | Ramalingam | |
| 6,064,963 A | 5/2000 | Gainsboro | |
| 6,070,241 A | 5/2000 | Edwards | |
| 6,078,807 A | 6/2000 | Dunn et al. | |
| 6,084,967 A | 7/2000 | Kennedy | |
| 6,091,835 A | 7/2000 | Smithies et al. | |
| 6,092,192 A | 7/2000 | Kanevsky et al. | |
| 6,094,476 A | 7/2000 | Hunt et al. | |
| 6,115,683 A | 9/2000 | Burstein et al. | |
| 6,119,084 A | 9/2000 | Roberts et al. | |
| 6,144,938 A | 11/2000 | Surace | |
| 6,149,056 A | 11/2000 | Stinson et al. | |
| 6,157,707 A | 12/2000 | Baulier et al. | |
| 6,163,768 A | 12/2000 | Sherwood et al. | |
| 6,167,517 A | 12/2000 | Gilchrist et al. | |
| 6,246,751 B1 | 6/2001 | Vladimir et al. | |
| 6,246,988 B1 | 6/2001 | Schier | |
| 6,266,617 B1 * | 7/2001 | Evans | 701/301 |
| 6,266,640 B1 | 7/2001 | Fromm | |
| 6,275,940 B1 * | 8/2001 | Edwards et al. | 726/2 |
| 6,320,956 B1 | 11/2001 | Cherry | |
| 6,359,971 B1 | 3/2002 | Haimi-Cohen | |
| 6,370,508 B2 | 4/2002 | Beck | |
| 6,401,066 B1 | 6/2002 | McIntosh | |
| 6,404,747 B1 | 6/2002 | Berry et al. | |
| 6,493,446 B1 | 12/2002 | Cherry | |
| 6,501,956 B1 | 12/2002 | Weeren | |
| 6,549,950 B2 * | 4/2003 | Lytle et al. | 709/246 |
| 6,604,075 B1 | 8/2003 | Brown | |
| 6,636,888 B1 * | 10/2003 | Bookspan et al. | 709/203 |
| 6,650,736 B1 | 11/2003 | Unger | |
| 6,738,740 B1 | 5/2004 | Barash | |
| 6,782,403 B1 * | 8/2004 | Kino et al. | 707/203 |
| 6,804,331 B1 * | 10/2004 | Vacek et al. | 379/88.02 |
| 6,859,524 B2 * | 2/2005 | Unger et al. | 379/88.16 |
| 6,957,185 B1 * | 10/2005 | Labaton | 704/500 |
| 7,203,653 B1 * | 4/2007 | McIntosh | 704/273 |
| 2006/0112165 A9 * | 5/2006 | Tomkow et al. | 709/206 |

OTHER PUBLICATIONS

Hill, Kimberly, Autonomy Digs Into Contact-Center Market, www.crmdaily.com, May 20, 2003.

U.S. Patent Office Recognizes New Multifunction Telecommunications Technology, Business Wire, Inc., Jun. 6, 1989.

VoiceLog, Total Slamming Control—The Ultimate in Third Party Verification, Press Release, www.voicelog.com, May 11, 1998.

VoiceLog, VoiceLog Third Party Verification Releases Updated Anti-Slamming Rules Report, Press Release, www.voicelog.com, Mar. 16, 1999.

VoiceLog, VoiceLog Announces True State-Specific Third Party Verification, Press Release, www.voicelog, com, May 9, 2000.

VoiceLog, VoiceLog Announces Easy Recording Download Function, Press Release, www.voicelog, com, Mar. 1, 2000.

VoiceLog, VoiceLog Announces Inbound That Delivers, Press Release, www.voicelog, com, Oct. 2, 2000.

VoiceLog, VoiceLog Third Party Verification Helps Telecommunications Industry Meet New FCC Anti-Slamming Rules, Press Release, www.voicelog, com, Dec. 20, 1998.

VoiceLog, VoiceLog Is First Choice for Third Party Verification, Press Release, www.voicelog, com, Aug. 10, 1998.

VoiceLog,Total Slamming Control—The Ultimate in Third Party Verification, Press Release, www.voicelog, com, May 11, 1998.

VoiceLog, VoiceLog Releases Study on State Attitudes Toward FCC Anti-Slamming Rules, Press Release, www.viocelog, com, Apr. 11, 1999.

VoiceLog, VoiceLog Third Party Verification Releases Updated Anti-Slamming Rules Report, Press Release, www.voicelog, com, Mar. 16, 1999.

VoiceLog, VoiceLog Announces Web Interface for Verification Retrievals and Audio Playback, Press Release, www.voicelog, com.

VoiceLog, VoiceLog Announces Dual Channel Recording, Press Release, www.voicelog, com, Jan. 4, 2000.

VoiceLog, VoiceLog Announces High Quality Name and Address Transcription, Press Release, www.voicelog, com, Feb. 1, 2000.

VoiceLog, VoiceLog Goes to the Ends of the Earth to Review Third Party Verification, Press Release, www.voicelog, com, Feb. 29, 2000.

VoiceLog, FCC Acknowledges Validity, Value of Automated Third Party Verification, Press Release, www.voicelog, com, Aug. 24, 2000.

VoiceLog, VoiceLog Announces CPNI Verification Products, Press Release, www.voicelog.com, Mar. 4, 1998.

VoiceLog, VoiceLog's 50 State "Anti-Slamming Rules Report" Available on the Internet, Press Release, www.voicelog.com, Feb. 4, 1998.

VoiceLog, VoiceLog Announces Cost Effective Verification for Electric Service, Press Release, www.voicelog.com, Jan. 6, 1998.

VoiceLog, VoiceLog Reaches 100 Accounts in 1997, Press Release, www.voicelog.com, Jan. 2, 1998.

VoiceLog, VoiceLog and Telecommunications on Demand Announce Distribution Agreement, Press Release, www.voicelog.com, Nov. 12, 1997.

VoiceLog, VoiceLog Offers Industry-Wide Solution to "Cramming", Press Release, www.voicelog.com, Apr. 21, 1998.

VoiceLog, VoiceLog Third Party Verification Releases Free Analysis of New FCC Anti-Slamming Rules, Press Release, www.voicelog.com, Feb. 9, 1999.

VoiceLog, VoiceLog Meets Anti-Slamming Rules for E-Commerce Internet Orders, Press Release, www.voicelog, com, Jan. 27, 1999.

VoiceLog, VoiceLog Announces "Quick Freeze"*The New Third Party Verification Program for Carrier Freezes* to Meet the FCC Anti-Slamming Rules, Press Release, www.voicelog, com, Jan. 12, 1998.

VoiceLog, VoiceLog Closes 1998 With Two Million Third Party Verification Transactions-Now the Leader in Preventing Slamming, Press Release, www.voicelog, com, Jan. 30, 1998.

VoiceLog, VoiceLog Appoints Karl Erickson As Chief Technology Officer, Press Release, www.voicelog.com, Oct. 7, 2002.

VoiceLog, VoiceLog Announces "Verifiably Able" New Program Offers Meaningful Employment to Physically Challenged, Press Release, www.voicelog.com, May 28, 2002.

VoiceLog, VoiceLog Announces New Operations Center Added Location Provides Additional Capacity, Redundancy, Reliability, Press Release, www.voicelog.com, Mar. 1, 2002.

VoiceLog, VoiceLog Announces Live Operator Third Party Verification, Press Release, www.voicelog.com, May 1, 2001.

VoiceLog, VoiceLog Announces Package for New FCC Rules, Press Release, www.voicelog.com, Jan. 30, 2001.

VoiceLog, VoiceLog and TSS AG (Switzerland) Bring Third Party Verification to Europe, Press Release, www.voicelog.com, Jan. 17, 2001.

VoiceLog, VoiceLog Announces Voice Recognition for Third Party Verifications, Press Release, www.voicelog.com, Nov. 4, 1997.

VoiceLog, VoiceLog Announces Winter Weather Insurance for Third Party Verifications, Press Release, www.voicelog.com, Oct. 31, 1997.

VoiceLog, VoiceLog Guarantees Third Party Verification Compliance, Press Release, www.voicelog.com, Sep. 23, 1997.

VoiceLog, California Leads the Nation in Slamming Control, Press Release, www.voicelog.com, Mar. 27, 1998.

VoiceLog, VoiceLog Announces Free Speech TPV—Speech Recognition-Based Verification At Touchtone Prices, Press Release, www.voicelog.com, Jan. 6, 2004.

VoiceLog, VoiceLog Offers Third Party Verification for Wireless Number Portability, Press Release, www.voicelog,com, Oct. 31, 2003.

VoiceLog, Bray Joins VoiceLog as Director of Live Operator Verification Services, Press Release, www.voicelog.com, Oct. 28, 2003.

VoiceLog, VoiceLog Offers Sarbanes-Oxley Employee Hotline Solution, Press Release, www.voicelog.com, Oct. 7, 2003.

VoiceLog, VoiceLog Makes INC 500 List of Fastest-Growing Private Companies Second Straight Year, Press Release, www.voicelog.com, Oct. 3, 2003.

VoiceLog, VoiceVerified Helps Telemarketers Meet New FTC Sales Rule, Press Release, www.voicelog.com, May 1, 2003.

VoiceLog, VoiceLog Scores A Win for Telecom Industry Against "Drop-Off" Rule Seeks Partners for Potential Suit Against FCC to Overturn, Press Release, www.voicelog.com, Mar. 27, 2003.

VoiceLog, VoiceLog Helps Telemarketers Meet New Telephone Sales Rule by Mar. 31 Deadline, No Need to Make Captial Investment to Record Telemarketing Sales, Press Release, www.voicelog.com, Mar. 12, 2003.

VoiceLog, VoiceLog Passes Half-Million Mark for Live Operator Verification Services Adds New Features and Functionality, Press Release, www.viocelog.com, Feb. 24, 2003.

VoiceLog, VoiceLog Ranked 77th in Inc Magazine's "Inc 500" for 2002, Press Release, www.voicelog.com, Oct. 15, 2002.

Triton Secure, www.tritonsecure.com.

Moving Into the Future, Newsweek, Apr. 29, 2002, 40 pages.

Face Recognition Technology, MATE-CCTV, Ltd., www.mate.co.il.

Niccolai, James, Comdex: Biometrics Puts a Face—or Finger—on Security, InfoWorld Media Group, Inc., Nov. 15, 2001.

Bruce, Laura, Face-Scanning, Fingerprinting ATMs Gain Ground, Bankrate.com, Mar. 2, 2001.

Panasonic Authenticam Iris Recognition Camera, www.panasonic.com.

Pearson, Helen, Stats Say Aye to ID Eye, Nature News Service, www.nature.com.

Iris Recognition Could Smooth Identification, The Instrumentation, Systems, and Automation Society, www.isa.org, Jul. 31, 2000.

Yang, S. Jae, A New Look In Security, PC Magazine, www.pcmag.com, Jan. 15, 2002.

Iris Recognition: The Technology, www.iris-scan.com.

Fingerprint and Eye Iris Pattern Identification Software, Libraries and Source Code, Neurotechnologija, Ltd., www.neurotechnologija.com, Apr. 15, 2002.

VoicePrint Security for Credit Cards, IBM Technical Disclosure Bulletin, Feb. 1994, pp. 189-190, vol. 37, Publication No. 2B.

PriceInteractive Launches Most Reliable Anti-Slamming Service New Enhanced Third Party Verification (TM) Solutions Cut Carrier Costs by More Than Half, PR Newswire via NewsEdge Corporation, Jul. 1, 1999.

* cited by examiner

SYSTEM, METHOD, AND COMPUTER READABLE MEDIA FOR CONFIRMATION AND VERIFICATION OF SHIPPING ADDRESS DATA ASSOCIATED WITH TRANSACTION

CROSS-REFERENCE TO RELATED APPLICATIONS

The present application is a continuation of and claims priority to U.S. patent application Ser. No. 10/173,794, filed Jun. 18, 2002, which is hereby incorporated by reference herein.

FIELD OF THE INVENTION

The present invention is generally related to data verification and more specifically, is related to methods, apparatus, and computer readable media for confirmation and verification of shipping address data associated with a transaction.

BACKGROUND OF THE INVENTION

There are various instances when a caller contacts or is contacted by a call center. Such contacts can relate to an inquiry about goods and/or services offered by merchants. While interacting with the call center, the caller can provide live voice/speech data to the call center, for example, to conduct a transaction with the call center. Part of the data pertinent to such a transaction is a delivery address associated with goods/services ordered by the caller. There are a number of limitations associated with ensuring at the delivery address is proper such as not capturing the information correctly. As such, what are needed are methods, apparatus, and computer readable media that ensures that a live operator is accurately capturing the address data as spoken by the caller, both for quality assurance purposes and for anti-fraud purposes.

BRIEF SUMMARY OF THE INVENTION

The present invention relates to methods, apparatus, and computer readable media for confirmation and verification of shipping address data associated with a transaction.

In one embodiment, a computer-based method of verifying first and at least second shipping address information associated with at least one transaction conducted over a telecommunications network and stored respectively in a first format and in at least a second format includes at least the following: locating the first shipping address information as stored in the first format, comparing the first address information to the at least second address information as stored in the at least second format, quantifying a difference between the first address information and the at least second address information as represented in the first and at least second formats, and dispositioning the transaction according the difference.

In another embodiment, an apparatus for verifying first and at least second shipping address information associated with at least one transaction conducted over a telecommunications network and stored respectively in a first format and in at least a second format including at least the following: means for locating the first shipping address information as stored in the first format, means for comparing the first address information to the at least second address information as stored in the at least second format, means for quantifying a difference between the first address information and the at least second address information as represented in the first and at least second formats, and means for dispositioning the transaction according the difference.

In a further embodiment, a program storage device readable by a machine, tangibly embodying a program of instructions executable by the machine to perform a method for verifying first and at least second shipping address information associated with at least one transaction conducted over a telecommunications network and stored respectively in a first format and in at least a second format comprises at least the following: locating the first shipping address information as stored in the first format, comparing the first address information to the at least second address information as stored in the at least second format, quantifying a difference between the first address information and the at least second address information as represented in the first and at least second formats, and dispositioning the transaction according the difference.

DETAILED DESCRIPTION OF THE INVENTION

Figure 1:
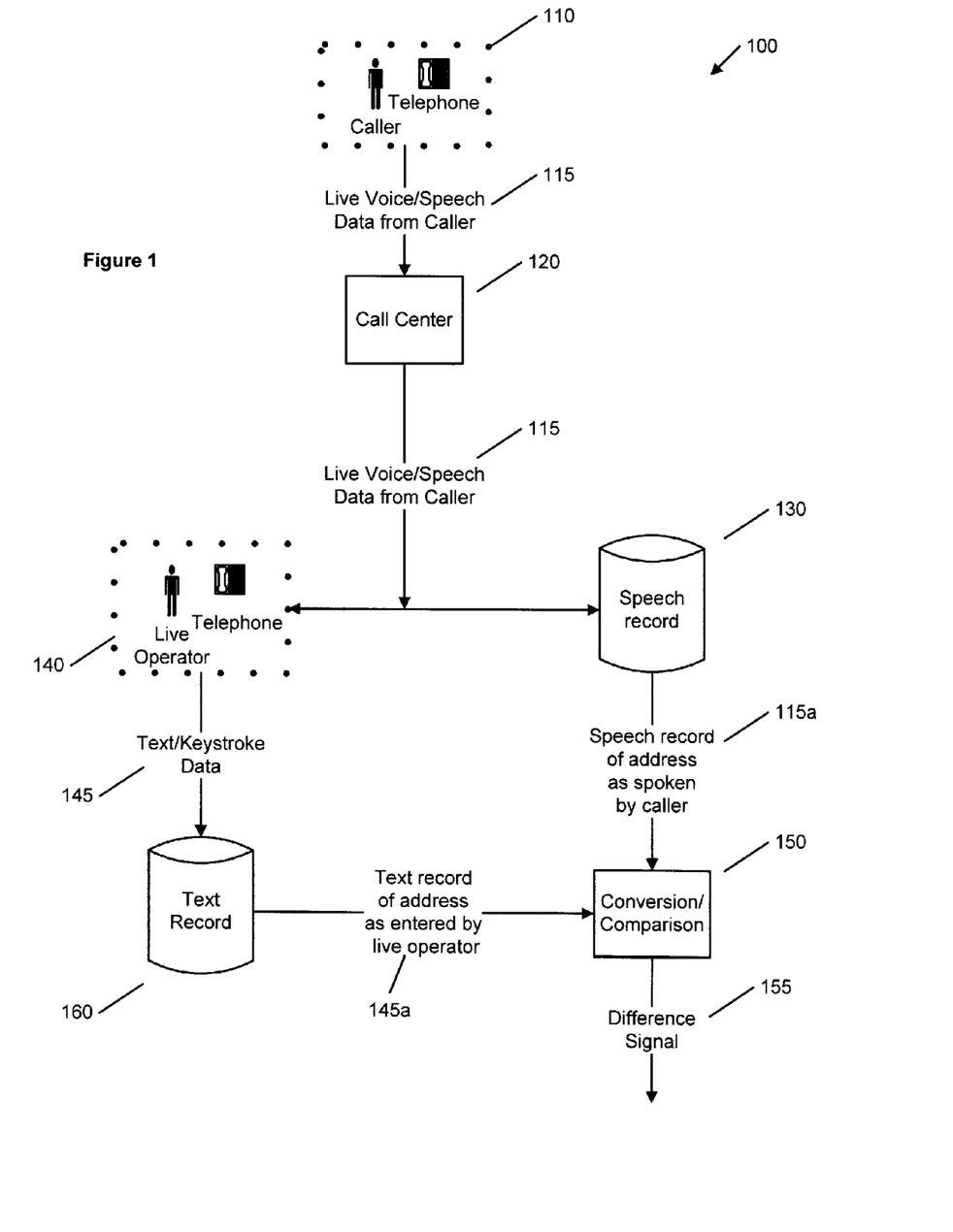
FIG. 1 is a block diagram of apparatus constructed according to an illustrative embodiment of the invention.

FIG. 1 is a block diagram of apparatus constructed according to an illustrative embodiment of the invention. As shown in FIG. 1, a caller may use conventional telephone equipment (both shown collectively by the reference numeral 110) to contact, or be contacted by, a call center 120, for example to order or inquire about goods and/or services offered by merchants who are clients of the call center 120. While interacting with the call center 120, the caller 110 provides live voice/speech data 115 to the call center 120, for example, to conduct a transaction with the call center 120. Part of the data pertinent to such a transaction is a delivery address associated with goods/services ordered by the caller 110. To facilitate processing this transaction, the call center 120 forwards the live voice speech data 115 to various entities within the call center 120. One such entity is a live operator using conventional call center telephone equipment to access call center resources, both shown collectively by the reference numeral 140. Another entity is speech record data store 130, which stores an archive copy of all speech or voice communications received from the caller 110. Speech record data store 130 can be implemented using any number of commercially available database management programs. Suitable programs are available from vendors such as Microsoft Corporation of Redmond, Wash., IBM/Informix, and others. The speech record data store 130 functions according to the invention to provide on demand a speech record of the address data as spoken live by the caller 110, which speech record is represented collectively by the reference numeral 115*a*.

Live operator 140 utilizes the resources of the call center 120 to conduct the transaction with the caller 110. One of the functions assigned to live operator 140 is to process speech/voice data 115 received live from the caller 110, and transcribe the same for storage as text/keystroke data 145 in a text record data store 160. Text record data store 160 may be implemented using similar technology to that discussed above for implementing speech record data store 130. Both speech record data store 130 and text record data store 160 may be hosted on the same computer hardware, or may be hosted on separate, respective computer hardware. Suitable host hardware is the Tandem™ server available from Compaq Corporation (www.compaq.com); however the invention is not limited to such servers and may be practiced using other hardware. In essence, the speech record data store 130 stores speech or voice data 115 as captured live from the caller 110, while the text record data store 160 captures corresponding text/keystroke data 145 as entered by the live operator 140. The text record data store 160 provides on demand a text record of address data as entered by the live operator 140, represented collectively by the reference numeral 145a. As understood by those skilled in the art, the text record data store 160 and the speech record data store 130 can be indexed by a unique transaction identifier, such that respective text data and speech data associated with a specific transaction can be extracted using the transaction identifier as a unique key or index.

Conversion/comparison apparatus 150 is coupled to receive the speech record 115a from the speech record data store 130, and the text record 145a from the text record data store 160. The conversion/comparison apparatus 150 functions to ensure that the contents of the text record 145a as captured by the live operator 140 is substantially consistent with the corresponding contents of the speech record 115a as stored in the speech record data store 130. In this manner, the conversion/comparison apparatus 150 ensures that the live operator 140 is accurately capturing the address data as spoken by the caller 110, both for quality assurance purposes and for anti-fraud purposes. The conversion/comparison apparatus 150 generates a difference signal 155, which indicates any difference detected by the conversion/comparison apparatus 150 between the speech record 115a and the text record 145a.

Those skilled in the art will understand that the various components shown in FIG. 1, such as the live operator 140, the speech record data store 130, the text record data store 160, and the conversion/comparison apparatus 150, may be provided either within or without the physical premises of the call center 120. Specifically, the live operator 140 may be employed as either an on-site operator reporting for on-site duty at the call center 120, or may be a home or remote agent who accesses resources of the call center 120 while working at a physical location remote from the call center 120. While the invention as described herein is equally applicable to an on-site implementation at the call center 120 or a home agent implementation, the invention may have particular utility as applied to the home agent context, wherein the home agent processing calls from caller 110 is not under immediate physical supervision by supervisory personnel.

Figure 1A:
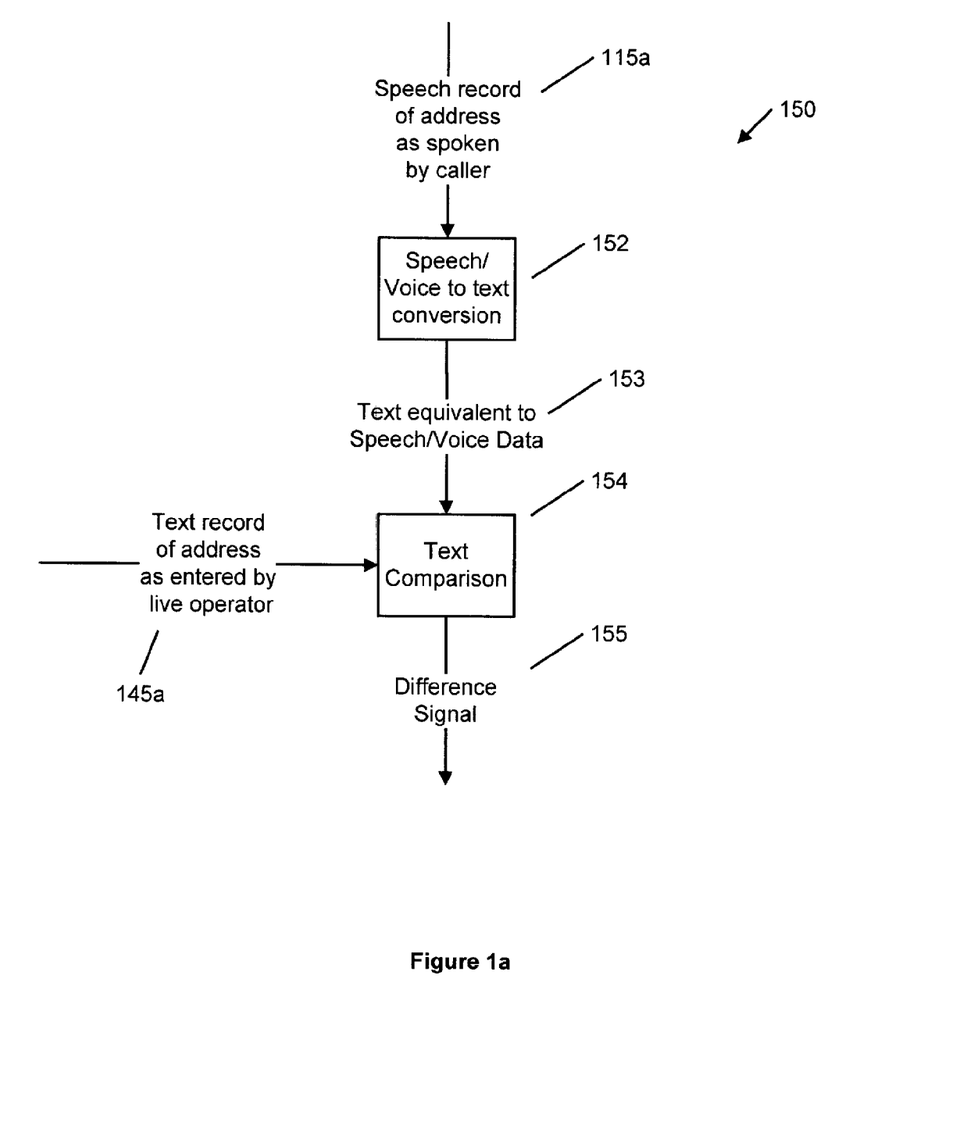
FIG. 1*a* is a block diagram providing additional detail regarding the conversion/comparison apparatus shown in FIG. 1.

FIG. 1a is a block diagram providing additional detail regarding the conversion/comparison apparatus shown in FIG. 1. As shown in FIG. 1a, the conversion/comparison apparatus 150 includes speech/voice to text conversion apparatus 152 and text comparison apparatus 154. The speech/voice to text conversion apparatus 152 receives the speech record 115a as shown in FIG. 1, and converts this input speech/voice to a text equivalent, shown by the reference numeral 153. Technology suitable for implementing the speech/voice to text conversion apparatus 152 is commercially available from a variety of vendors, such as Nuance Corporation, whose web site is posted at the URL www.nuance.com. Similar voice recognition or speech-to-text technology is available from other vendors as well, and those skilled in the art will understand that the invention as described herein is not limited to technology provided by any one vendor.

Text comparison apparatus 154 receives as input the text equivalent data 153 generated as output by speech/voice to text conversion apparatus 152. The text comparison apparatus 154 receives as further input the text record 145a shown in FIG. 1. Text comparison apparatus 154 functions to compare the text equivalent 153 of the spoken address data to the text record of the address data 145a as entered by the live operator 140. The differences between the text comprising these two inputs are output as the difference signal 155. The processing performed by the apparatus shown in FIG. 1a may be performed either in real time with the transaction being conducted with the caller 110, or in a batch process executed after the fact.

Those skilled in the art will recognize that shipping or delivery address information in the context of the transaction environment described above typically includes street address, city, state, and zip code information. Speech/voice to text conversion apparatus 152 as shown in FIG. 1a can be adapted to use key words, panels, or other similar indexing mechanisms to locate and extract the speech and/or voice data spoken live by the caller 110 corresponding to each of these fields, and to convert the same into equivalent text input to the text comparison apparatus 154. The text comparison apparatus 154 can then do a field-by-field text comparison of the text record data 145a to the text equivalent data 153, and quantify or store the differences between each field. As discussed in further detail below, depending on the level of differences between the various fields in the address data, various follow-up actions may be taken to disposition the underlying transaction with the caller 110.

Figure 2:
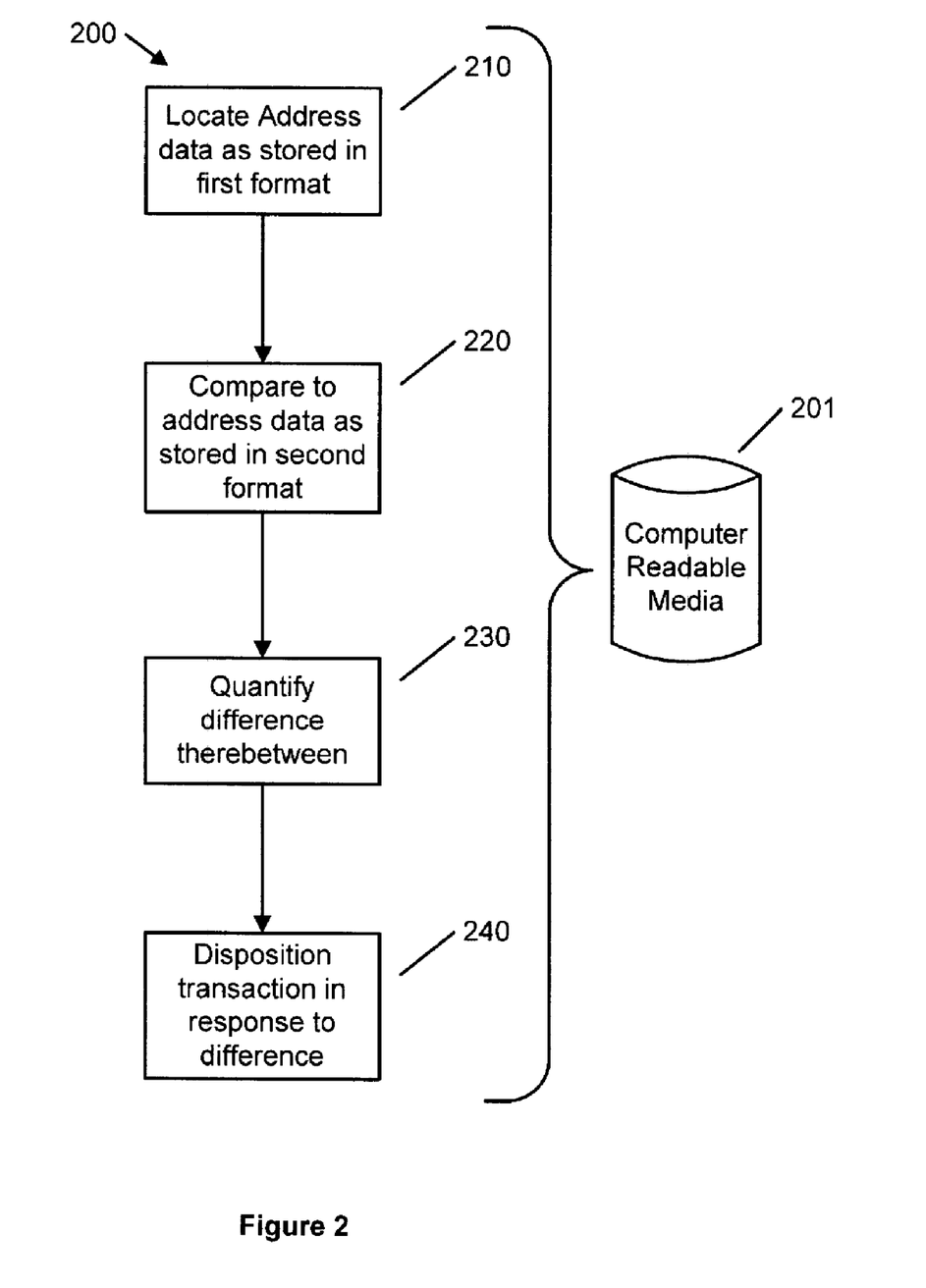
FIG. 2 is a flowchart of an overall process flow provided according to an illustrative embodiment of the invention.

FIG. 2 is a flowchart of an overall process flow 200 provided according to an illustrative embodiment of the invention. As shown in FIG. 2, the process 200 includes locating address data as stored in a first format (block 210), comparing this address data to address data stored in a second format (block 220), quantifying the difference therebetween (block 230), and dispositioning a transaction conducted with the caller 110 in response to this difference (block 240).

Figure 3:
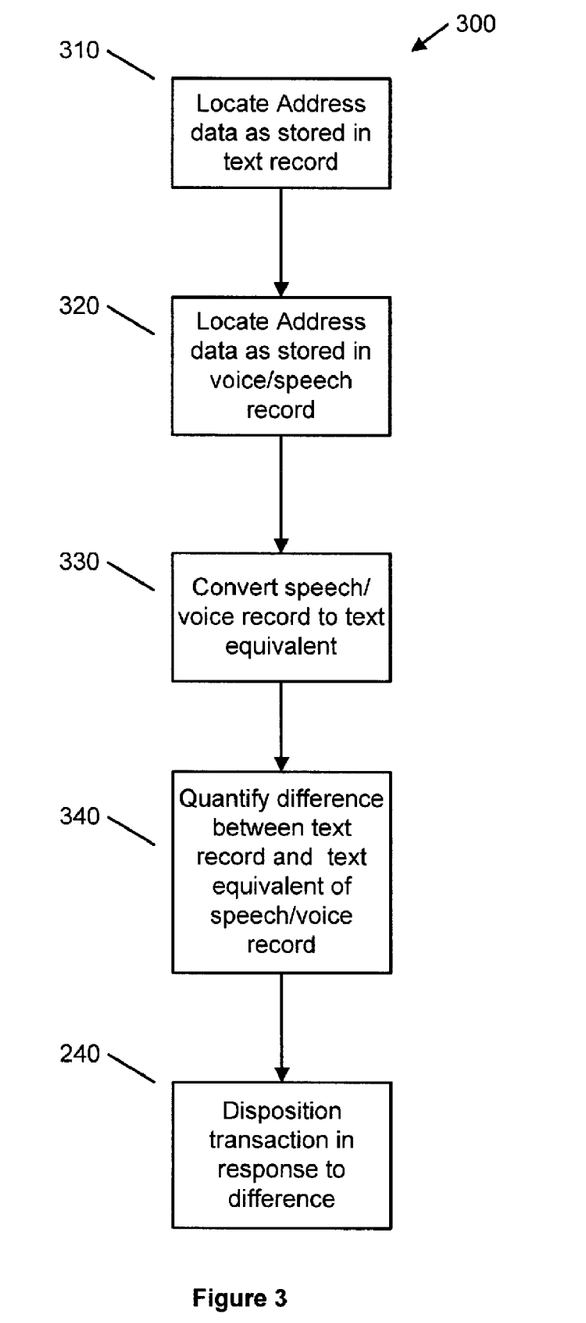
FIG. 3 is a flowchart of an overall process flow provided according to another illustrative embodiment of the invention.

According to various embodiments of the invention, the method can include converting a voice- or speech-based representation of the address data 115a to a text equivalent 153, and comparing that text equivalent 153 to the corresponding keystroke data 145 entered by the live operator 140. FIG. 3 is a flowchart of an overall process flow 300 provided according to such an embodiment of the invention. As shown in FIG. 3, the method includes at least the following. At block 310, the method locates address data as stored in a text record 145a by the live operator 140. At block 320, the method locates a speech record 115a of the address data as stored within speech record data store 130. At block 330, the method converts the speech/voice record 115a to a text equivalent 153, using, for example, speech recognition or speech-to-text technology available from a variety of vendors as discussed above. At block 340, the method quantifies a difference between the text record 145a obtained from the text record data store 160 and the text equivalent 153 obtained above from the speech/voice record 115a as stored in the speech record data store 130. At block 240, the method dispositions the underlying transaction in response to the above difference between the text record 145a and the text equivalent 153.

Figure 4:
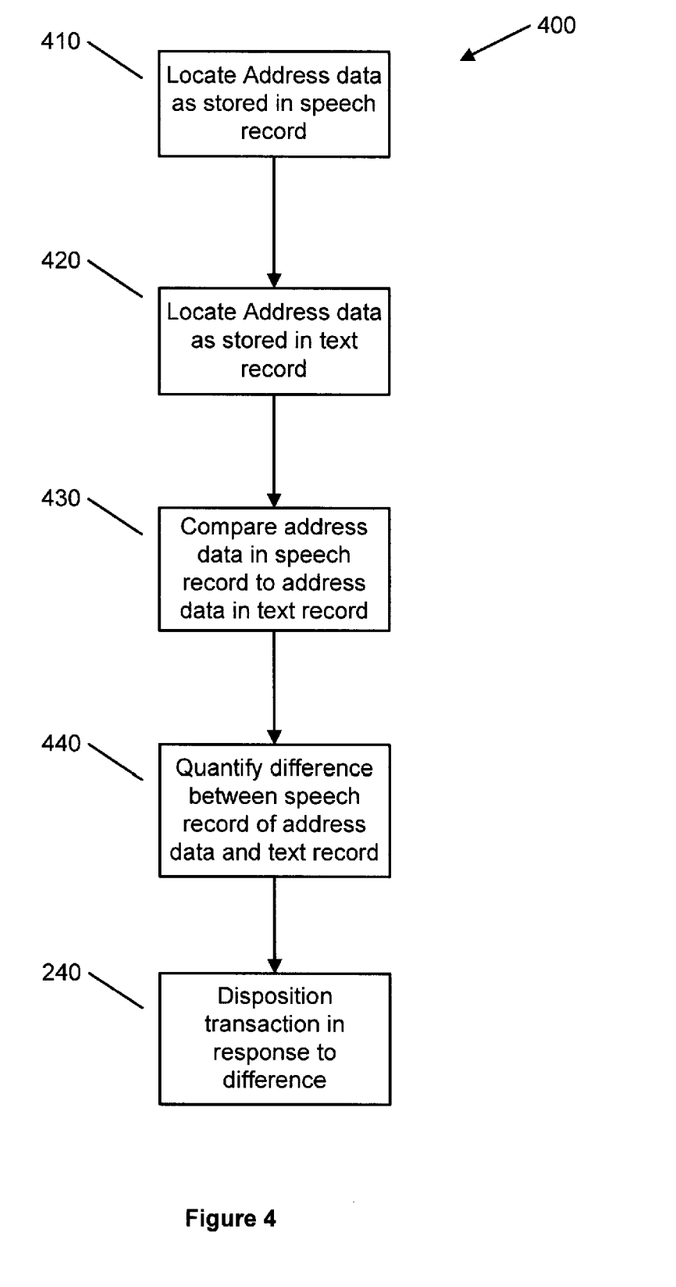
FIG. 4 is a flowchart of an overall process flow provided according to another illustrative embodiment of the invention.

According to other embodiments of the invention, the method can include accessing the speech record 115a of the address as spoken by the caller, and comparing it directly to the corresponding text record 145a. FIG. 4 is an overall flowchart of a process flow 400 provided according to such an embodiment. In this embodiment, the method 400 includes at least the following. At block 410, the method locates the address data 115a as stored in the speech record data store 130. At block 420, the method located corresponding address data 145a as entered by the live operator 140 in the text record data store 160. At block 430, the method compares the address data 115a from the speech record data store 130 to the address data 145a as stored in the text record data store 160.

The comparison represented by block 430 can include a manual comparison, wherein supervisory personnel at the call center 120 may listen to the speech record 115a obtained from speech record data store 130, while also reviewing the corresponding text record entry 145a from the text record data store 160. Conversely, the comparison represented by block 430 may include utilizing a text to speech conversion engine, which is available from a variety of vendors (including Nuance), and feeding the output of this engine to an automated function that compares this output to the corresponding speech data 115a obtained from the speech record data store 130.

Figure 5:
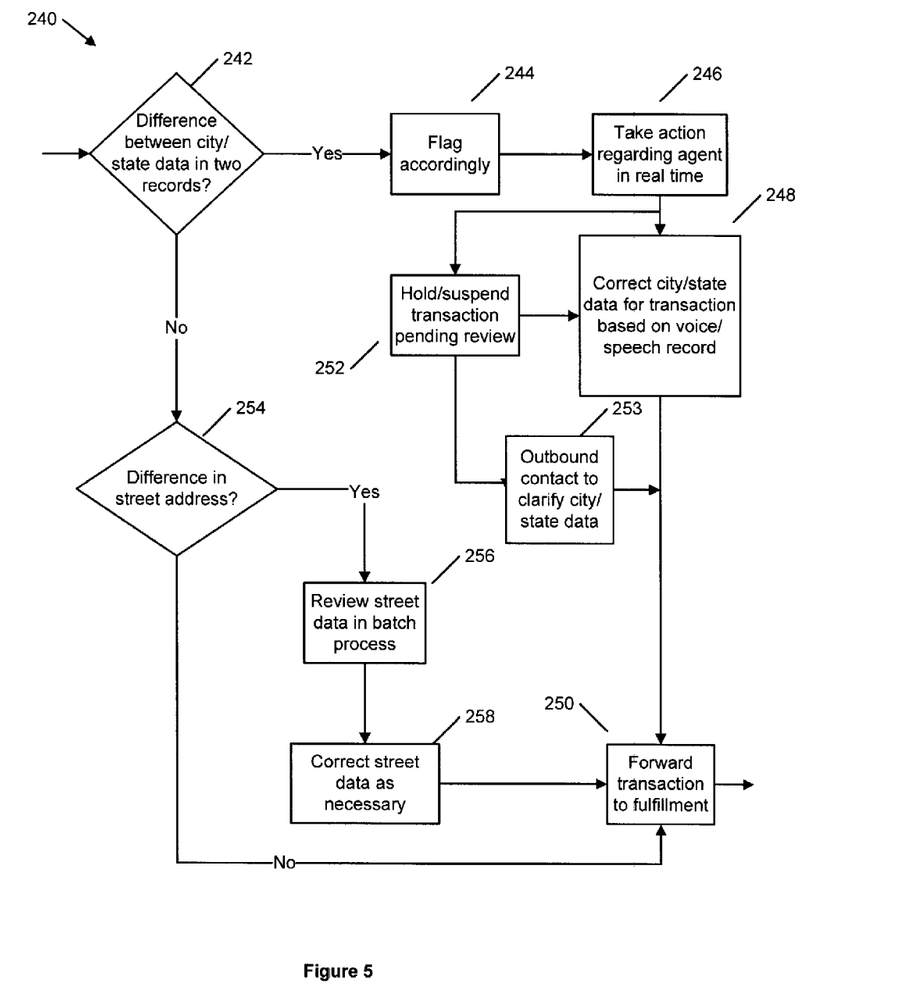
FIG. 5 is a flowchart illustrating a thresholding/dispositioning process provided according to an illustrative embodiment of the invention.

At block 440, the method quantifies any differences located between the speech record 115a of the address data as stored in the speech record data store 130 with the corresponding text record 145a for the address data as stored in text record data store 160. In essence, the quantifying process 440 illustrated in FIG. 4, along with the similar processes 230 and 340, shown in FIGS. 2 and 3 respectively, include generating a score or other quantifying mechanism suitable for indicating how closely the various data fields comprising the respective address data as represented in the text record data store 160 and the speech record data store 130 match. An illustrative embodiment of this processing is shown in FIG. 5 below, and is discussed in more detail therewith. In block 240, the method dispositions the transaction in response to the difference between the address data as represented in the speech record data store 130 and the text record data store 160.

FIG. 5 is a flowchart illustrating a dispositioning process provided according to an illustrative embodiment of the invention. As shown in FIG. 5, the dispositioning process 240 shown in FIGS. 2, 3, and 4 may function as follows. At block 242, a difference between city/state data as contained in the text record 145a and the speech record 115a is evaluated and scored. If there is a significant difference between the city/state data in these two records, processing proceeds to block 244, where the underlying transaction is flagged to indicate this status. Typically, a significant difference (more than a mere typographical error) between city/state data in the two records would indicate a possibility of either fraud committed by the live operator 140 (deliberately misdirecting goods/services ordered by the caller 110 to the live operator 140), or some other type of quality control issue involving the specific live operator 140. To address such issues, the method advances to block 246, where an action is taken regarding the agent 140 in real time with the processing of the transaction with the caller 110. Depending on the severity of the difference between the respective address fields, the live operator 140 may be taken off line and prevented from handling further interactions with caller 110 or other subsequent callers 110, with the interaction with the present caller 110 possibly being resumed by supervisory personnel. Depending on the resolution of the situation, the live operator 140 may be placed back on line later on, if circumstances warrant.

At block 248, the method can include correcting the text record 145a the text record data store 160 for the current transaction. This correction may be facilitated by reviewing the corresponding voice/speech record 115a pertaining to the current transaction, which is stored in speech record data store 130, or by entering the text equivalent data 153 directly into the text record data store 160. The processing represented by block 248 may be conducted either manually by supervisory personnel, or may be part of an automated process. Alternatively, as represented in block 252, the underlying transaction may be held in a suspended status pending review and resolution of the above-described issues, and not be forwarded to fulfillment, if at all, until the above issues are resolved. If such issues can be resolved without additional contact with the caller 110, processing proceeds to block 248 as described above, and then proceeds to block 250, where the corrected transaction is forwarded to fulfillment.

If it is not possible to resolve the situation any other way, the method proceeds to block 253, which represents an outbound contact to the caller 110 to clarify the details of the transaction, including the shipping address to which the goods/services ordered by the caller 110 should be directed. Once these details are clarified, the method proceeds to block 250, where the corrected transaction is forwarded to fulfillment.

Returning to evaluation block 242, if there is no significant difference between the city/state data as represented in the speech record 115a and the text record 145a, processing proceeds to block 254. As represented at block 254, the method evaluates whether any significant difference exists in the street address portion of the text record 145a and the speech record 115a. If a significant difference exists, processing proceeds to block 256, where supervisory personnel or an automated process may review this address data in a batch or other type of process. As represented at block 258, any errors in the street address are corrected as necessary, either manually by supervisory personnel, or automatically in a batch type process. The corrected transaction is then sent to fulfillment, as represented by block 250.

Returning to FIG. 2, the program of instructions can be loaded and stored onto a program storage medium or device 201 readable by a computer or other machine, embodying a program of instructions executable by the machine to perform the various aspects of the method as discussed and claimed herein, and as illustrated in the Figures. Generally speaking, the program storage medium 201 can be implemented using any technology based upon materials having specific magnetic, optical, semiconductor or other properties that render them suitable for storing computer data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only or random access memory. In short, this embodiment of the invention may reside either on a medium directly addressable by the computer's processor (main memory, however implemented) or on a medium indirectly accessible to the processor (secondary storage media such as hard disk drives, tape drives, CD-ROM drives, floppy drives, or the like). Consistent with the above teaching, program storage device 201 can be affixed permanently or removably to a bay, socket, connector, or other hardware provided by the cabinet, motherboard, or other component of a given computer system.

Those skilled in the art will also understand that a computer programmed in accordance with the above teaching using known programming languages provides means for realizing the various functions, methods, and processes as described and claimed herein and as illustrated in the drawing figure attached hereto.

Various embodiments of the invention are described above to facilitate a thorough understanding of various aspects of the invention. However, these embodiments are to be understood as illustrative rather than limiting in nature, and those skilled in the art will recognize that various modifications or extensions of these embodiments will fall within the scope of the invention, which is defined by the appended claims.

What is claimed is:

1. A method of comparing first and second address information associated with a transaction conducted over a telecommunications network, the method comprising:
    obtaining at least one of the first address information and the second address information during a customer initiated call over the telecommunications network;
    converting by a processor one of the first address information and the second address information to a format compatible for comparison with the other of the first address information and the second address information;
    performing a field-by-field comparison of the converted one of the first address information and the second address information to the other of the first address information and the second address information;
    quantifying a difference between the converted one of the first address information and the second address information and the other of the first address information and the second address information, wherein the quantifying generates a score indicating how closely the field-by-field comparison match;
    wherein if the field-by-field comparison are closely matched relating to city and state data of the address information, quantifying a difference between a street address portion of the address information; and
    dispositioning the transaction according to either of the differences.

2. The method of claim 1, wherein the conversion of the one of the first address information and the second address information is conducted using a speech recognition program.

3. The method of claim 1, wherein the field-by-field comparison and quantifying steps are performed in real time relative to acquisition of the first and the second address information.

4. The method of claim 1, further comprising storing the converted one of the first address information and the second address information as a text record.

5. The method of claim 4, wherein the quantifying step includes identifying text differences in respective data fields between the converted one of the first address information and the second address information and the other of the first address information and the second address information.

6. The method of claim 1, wherein at least one of the first address information and the second address information is stored using an indexing mechanism.

7. The method of claim 1, wherein the quantifying step includes establishing a first threshold and at least a second threshold for a difference between the converted one of the first address information and the second address information and the other of the first address information and the second address information.

8. The method of claim 1, wherein the dispositioning step includes suspending processing of the transaction.

9. The method of claim 1, wherein the dispositioning step includes reviewing the first address information and the second address information associated with the transaction in a batch process before sending the transaction to a fulfillment entity.

10. A system for comparing first and second address information associated with a transaction conducted over a telecommunications network, the system comprising: a call center structured to obtain at least one of the first address information and the second address information during a customer initiated call over the telecommunications network;
    a conversion apparatus comprising a processor and a memory structured to convert one of the first address information and the second address information to a format compatible for comparison with the other of the first address information and the second address information;
    a text comparison apparatus structured to perform a field-by-field comparison of the converted one of the first address information and the second address information to the other of the first address information and the second address information, and quantify a difference between the converted one of the first address information and the second address information and the other of the first address information and the second address information, wherein the quantifying generates a score indicating how closely the field-by-field comparison match; wherein if the field-by-field comparison are closely matched relating to city and state data of the address information, the text comparison apparatus is structured to quantify a difference between a street address portion of the address information, and disposition the transaction according to either of the differences.

11. The system of claim 10, wherein the conversion apparatus includes a speech recognition program.

12. The system of claim 10, further comprising a server structured to store the converted one of the first address information and the second address information as a text record.

13. The system of claim 12, wherein the server is further operable to store at least one of the first address information and the second address information using an indexing mechanism.

14. A computer readable medium comprising instructions operable to perform method steps for comparing first and second address information associated with a transaction conducted over a telecommunications network, the method steps comprising: obtaining at least one of the first address information and the second address information during a customer initiated call over the telecommunications network;
    converting by a processor one of the first address information and the second address information to a format compatible for comparison with the other of the first address information and the second address information;
    performing a field-by-field comparison of the converted one of the first address information and the second address information to the other of the first address information and the second address information;
    quantifying a difference between the converted one of the first address information and the second address information and the other of the first address information and the second address information, wherein the quantifying generates a score indicating how closely the field-by-field comparison match;

wherein if the field-by-field comparison are closely matched relating to city and state data of the address information, quantifying a difference between a street address portion of the address information; and dispositioning the transaction according to either of the differences.

15. The computer readable medium of claim 14, wherein the conversion of the one of the first address information and the second address information is conducted using instructions embodied as a speech recognition program.

16. The computer readable medium of claim 14, wherein the field-by-field comparison and quantifying steps are performed in real time relative to acquisition of the first address information and the second address information.

17. The computer readable medium of claim 14, wherein the method further comprises storing the converted one of the first address information and the second address information as a text record.

18. The computer readable medium of claim 14, wherein the quantifying step includes identifying text differences in respective data fields between the converted one of the first address information and the second address information and the other of the first address information and the second address information.

19. The computer readable medium of claim 14, wherein the quantifying step includes establishing a first threshold and at least a second threshold for a difference between the converted one of the first address information and the second address information and the other of the first address information and the second address information.

20. The computer readable medium of claim 14, wherein the dispositioning step includes suspending processing of the transaction.

\* \* \* \* \*